(12) United States Patent
Yasuda et al.

(10) Patent No.: US 6,824,494 B2
(45) Date of Patent: Nov. 30, 2004

(54) PLANETARY GEAR UNIT

(75) Inventors: Takashi Yasuda, Anjo (JP); Akihiko Kita, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/286,950

(22) Filed: Nov. 4, 2002

(65) Prior Publication Data

US 2003/0104895 A1 Jun. 5, 2003

(30) Foreign Application Priority Data

Nov. 30, 2001 (JP) .................................... 2001-367728

(51) Int. Cl.$^7$ ................................................. F16H 3/44
(52) U.S. Cl. .................. 475/327; 475/315; 475/321
(58) Field of Search ................................. 475/326, 327, 475/328, 314, 315, 316, 320, 321, 322

(56) References Cited

U.S. PATENT DOCUMENTS

| | | | | |
|---|---|---|---|---|
| 5,029,688 A | * | 7/1991 | Hayakawa et al. .... | 192/113.32 |
| 5,052,991 A | * | 10/1991 | Yamaguchi et al. ........ | 475/344 |
| 5,480,361 A | * | 1/1996 | Murakami et al. .......... | 475/328 |
| 5,607,371 A | * | 3/1997 | Yamaguchi ................. | 475/210 |
| 6,592,489 B2 | * | 7/2003 | Tajima et al. ............... | 475/323 |

FOREIGN PATENT DOCUMENTS

| JP | 411094045 | * | 4/1999 |
|---|---|---|---|
| JP | 2001124191 | * | 5/2001 |

* cited by examiner

*Primary Examiner*—Ha Ho
(74) *Attorney, Agent, or Firm*—Lorusso, Loud & Kelly

(57) ABSTRACT

Friction disks of a clutch are axially positioned and supported relative to the drum of the clutch, using a tapered snap ring. Furthermore, an engaging member coupled with a ring gear is axially positioned and supported by sandwiching between the tapered snap ring and another snap ring. Accordingly, the structure accommodates and supports receipt of hydraulic pressure, as well as thrust force of the ring gear.

11 Claims, 6 Drawing Sheets

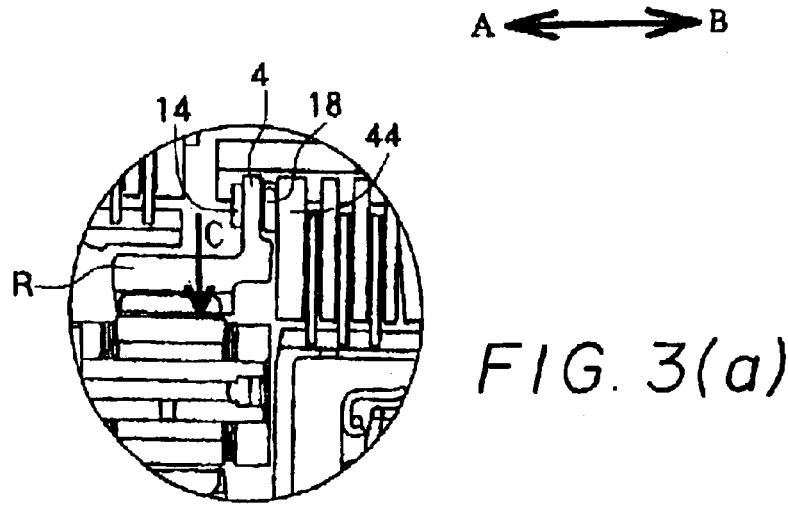
FIG. 3(a)
FIG. 3(b)
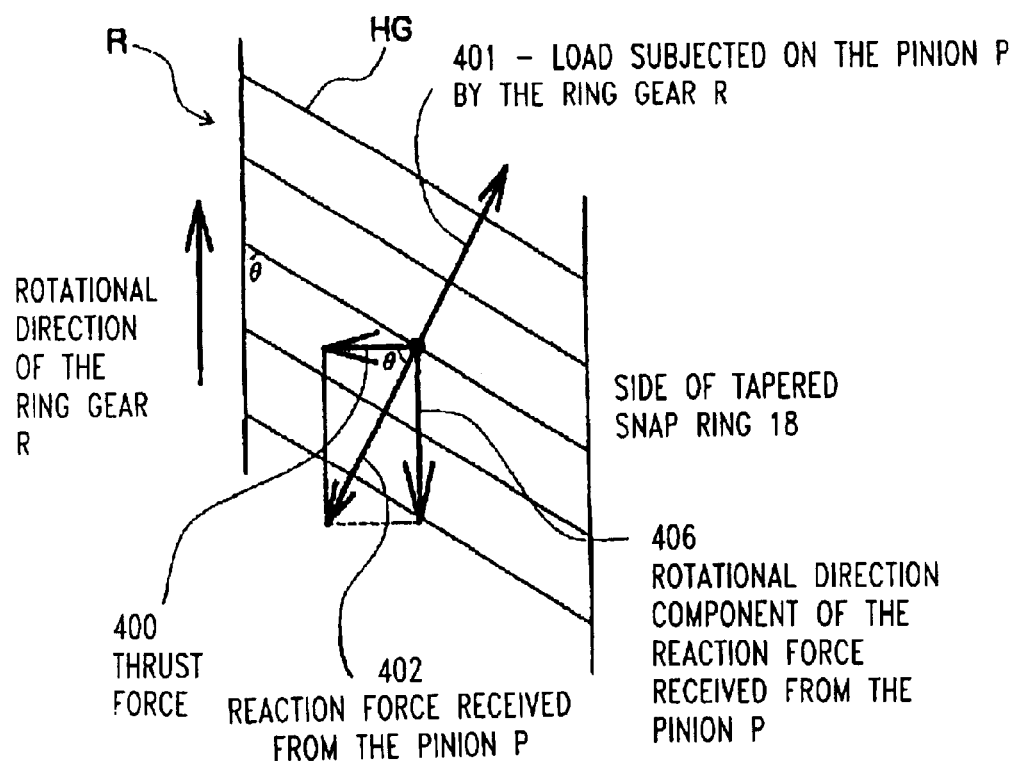
LOAD STATE IN A DRIVE STATE DURING REVERSE DRIVE

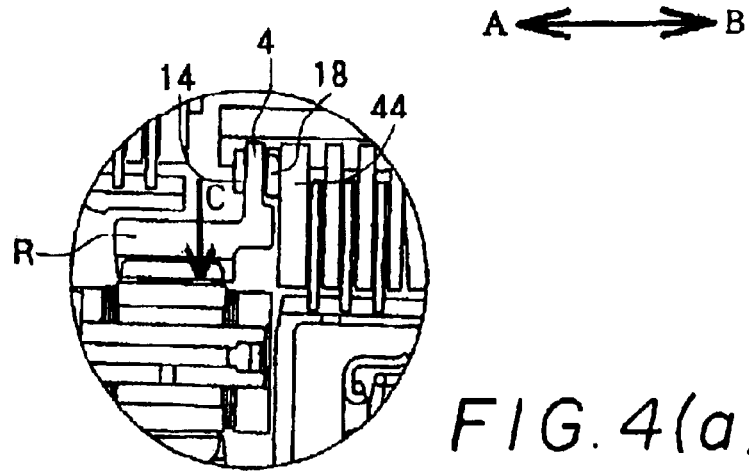
FIG. 4(a)
FIG. 4(b)
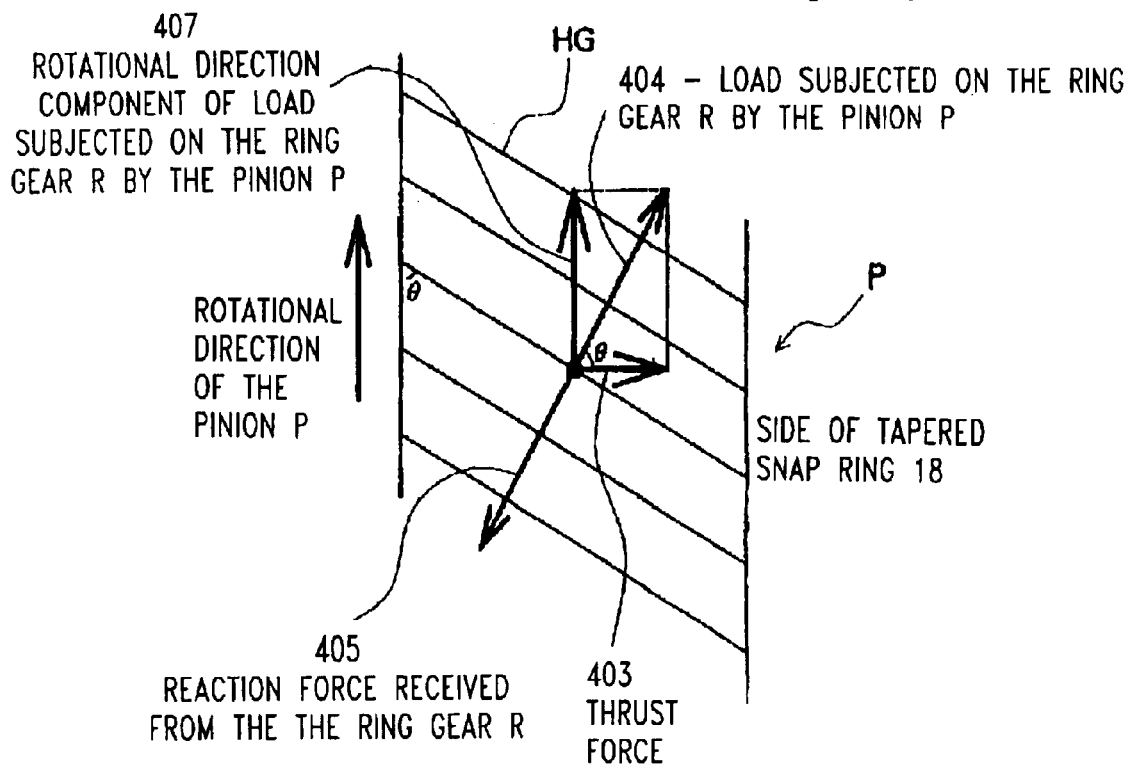
LOAD STATE IN A COAST STATE DURING REVERSE DRIVE

US 6,824,494 B2

PLANETARY GEAR UNIT

BACKGROUND OF THE INVENTION

1. Field of Invention

The present invention relates to a planetary gear unit used in an automatic transmission. In particular, the present invention relates to a structure for positioning and supporting a clutch member coupled with one element of a planetary gear and engaging a clutch drum, and to friction disks for frictionally engaging a clutch drum.

2. Description of Related Art

Planetary gear units are commonly used in automatic transmissions. For example, a planetary gear unit is used as a forward-reverse switching mechanism for switching between forward travel and travel in reverse using a belt type continuously variable transmission (hereinafter referred to as "CVT").

FIG. 6 shows in cross-sectional view, a conventional planetary gear unit 100 as including planetary gearing 200, a clutch for forward (hereinafter referred to as "forward clutch C1") and a brake B1 for reverse (hereinafter referred to as "reverse brake B1"). The planetary gearing 200 includes a sun gear S, a ring gear R, a carrier CR, and a pinion P supported by the carrier CR and meshing with both the ring gear R and the sun gear S, all of which members are disposed around an input shaft 103.

A hydraulic actuator 111 for operation of the forward clutch C1 has a clutch drum 109, a piston member 112, a return spring 113, and the like. Furthermore, a hydraulic actuator 123 for operation of the reverse brake B1 is formed in a partition wall portion of a case 106, and further includes a piston member 124, a return spring 125, and the like.

The aforementioned input shaft 103 is coupled both to an output portion of a torque converter (not shown) and to the clutch drum 109. The ring gear R is axially positioned and supported (in the direction indicated by the arrows A–B in FIG. 6) by being sandwiched between two snap rings 240 and 241 and is splined to an end hub portion of the clutch drum 109. A pressure receiving member 244 of the outer friction disks 116 of the forward clutch C1 is axially positioned and supported (in the direction indicated by the arrows A–B in FIG. 6) (sandwiched) by a snap ring 242 and splining with the interior surface of an end hub portion of the clutch drum 109.

Inner friction disks 117 of the forward clutch C1 are splined to an end hub portion of disk member 114. The disk member 114 has its inner peripheral portion fixed to the sun gear S. In addition, the sun gear S is splined to the primary pulley 105.

Outer friction disks 118 of the reverse brake B1 are splined to the aforementioned case 106. Furthermore, inner friction disks 119 of the reverse brake B1 are splined to the outer surface of an end hub portion of a side disk 230 which is one portion of the planetary carrier CR.

With a planetary gear unit as described above, if working pressure is applied to the hydraulic actuator 111 of the forward clutch C1, the piston member 112 slides in the direction indicated by the arrow A in FIG. 6, against the force of the return spring 113. Thus, the outer friction disks 116 and the inner friction disks 117 of the forward clutch C1 are forced together so that they become engaged by frictional force. As a result, the input rotation of the clutch drum 109 engaged with the aforementioned input shaft 103 is transmitted to the primary pulley 105 via the forward clutch C1, the disk member 114 and the sun gear S. Accordingly, if the forward clutch C1 is engaged and the reverse brake B1 is released, the torque of the input shaft 103 is output as normal (forward) rotation of the primary pulley 105.

Furthermore, if working pressure is applied to the hydraulic actuator 123 of the reverse brake B1, piston member 124 is forced to slide in the direction indicated by the arrow A in FIG. 6, against the force of a return spring 125. Thus, the outer friction disks 118 and the inner friction disks 119 of the reverse brake B1 are forced together so that they become engaged by frictional force. As a result, the carrier CR is fixed with respect to the case 106 via the reverse brake B1. The input rotation of the clutch drum 109, engaged with the input shaft 103, is transmitted as reverse rotation to the primary pulley 105, via the ring gear R, the carrier CR fixed with respect to the case 106, and the sun gear S. Accordingly, if the reverse brake B1 is engaged and the forward clutch C1 is released, the torque of the input shaft 103 is output as reverse rotation to the primary pulley 105.

However, with the aforementioned planetary gear unit 100, in order to axially position and support the ring gear R and the pressure receiving member 244 relative to the clutch drum 109, three snap rings 240, 241 and 242 are utilized. This configuration does not allow for cost savings which might otherwise be attainable through reduction of parts. Moreover, a configuration in which the snap rings 241 and 242 are disposed between the ring gear R and the forward clutch C1, leads to design problems related to strength and assembly. In other words, space is required for receiving the snap rings 241 and 242, which impedes making the overall planetary gear unit 100 more axially compact.

SUMMARY OF THE INVENTION

Accordingly, it is an object of the present invention to provide a planetary gear unit that can solve the problems mentioned above. This is accomplished by axially positioning and supporting the friction disks of the clutch relative to the clutch drum using a first stopper member. Furthermore, an engaging member coupled with one element of the planetary gear is axially positioned and supported by being sandwiched between the first stopper member and a second stopper member.

A planetary gear unit according to one embodiment of the present invention is provided with planetary gearing and a clutch having a clutch drum disposed adjacent to the planetary gearing. The planetary gearing includes: an engaging member which is coupled with one element of the planetary gearing and is engaged with an interior surface of the clutch drum; a first stopper member axially positioning and supporting friction disks of the clutch and disposed on the interior surface of the clutch drum; and a second stopper member axially positioning and supporting the aforementioned engaging member and also disposed on the internal surface of the clutch drum. The planetary gear unit has the engaging member sandwiched between the first stopper member and the second stopper member, thus axially positioning and supporting the engaging member.

In the first embodiment of the present invention, the friction disks are axially positioned and supported by the first stopper member and the engaging member is axially positioned and supported by being sandwiched between the first stopper member and the second stopper member. Accordingly, it is possible to save cost by reducing the number of parts. Furthermore, since the friction disks (in particular, a pressure receiving portion thereof) are axially positioned and supported by the first stopper member, and the engaging member is axially positioned and supported by being sandwiched between the first stopper member and the second stopper member, the spacing between the friction disks and the engaging member is only that which is necessary for provision of the first stopper member. Accordingly, the space between the engaging member and the friction disks (in particular, the pressure receiving portion thereof) is small, and it is possible to make the entire planetary gear unit more axially compact.

Preferably, the aforementioned clutch drum has a toroidal recess in its internal peripheral surface, and the first stopper member is a tapered snap ring having a tapered surface abutting against a corner portion of the recess and an abutting surface that abuts against an inner surface of the recess.

The tapered snap ring ("first stopper member") fits into the toroidal recess formed in the internal surface of the clutch drum without any clearance. As a result, it is possible to maintain highly accurate positioning of the friction disks of the clutch and the engaging member. Moreover, the tapered snap ring can maintain highly accurate positioning of the friction disks of the clutch even as pressure is received from the hydraulic servo of the clutch. Accordingly, it is possible to execute highly accurate hydraulic control of the clutch. In addition, it is also possible to maintain highly accurate positioning of the friction disks of the clutch even when the clutch is disengaged. As a result, it is possible to maintain the spacing between the friction disks of the clutch with a high degree of accuracy, thus preventing any contact between the friction disks which, in turn, prevents unwanted wear and seizure of the friction disks.

The abutting surface of the aforementioned tapered snap ring is disposed facing the engaging member. As a result, it is possible to maintain the position of the tapered snap ring with a high degree of accuracy even when pressure is received from the hydraulic servo of the clutch. Accordingly, it is possible to maintain the axial positioning of the friction disks and the engaging member and to execute stable and highly accurate hydraulic control of the clutch.

The planetary gear unit of the present invention preferably has the aforementioned engaging member provided with an axially extending protrusion located radially inward of the tapered snap ring, thus preventing the first stopper member from slipping out from the clutch drum. The planetary gear unit according to the third embodiment is otherwise like one of the first and second embodiments of the present invention.

The planetary gear unit of the present invention preferably has planetary gearing which includes helical gears. Although the helical gears make it possible to reduce gear noise of the planetary gearing, the helical gears also generate thrust force. However, since the first stopper member and the second stopper member axially position the engaging member, the positions of the engaging member and the friction disks are maintained with a high degree of accuracy. Furthermore, in particular, if the first stopper member is a tapered snap ring, it is possible to maintain the axial positions of the engaging member and the friction disks with an even greater degree of accuracy.

A fifth embodiment of the present invention is the planetary gear unit of the present invention which has its planetary gearing configured such that no thrust force is generated by the helical gears when the clutch is engaged. Generation of thrust forced in the first stopper member is prevented by coupling the engaging member with one element of the planetary gearing. Accordingly, it is possible to avoid affecting the axial positioning and support of the friction disks of the clutch and, as a result, it is possible to provide highly accurate hydraulic control of the clutch.

The one rotary element of the planetary gearing to which the engaging member is coupled may be a ring gear. In this configuration the engaging member is fixed to the ring gear and extends radially outward into engagement with the internal surface of the clutch drum. As a result, it is possible to axially position and support the engaging member and the ring gear with a high degree of accuracy relative to the clutch drum.

Alternatively, the one rotary element of the planetary gearing to which the engaging member is coupled is a sun gear. In this configuration, the engaging member is fixed to a sun gear and extends radially out from the sun gear into engagement with the internal surface of the clutch drum. As a result, it is possible to axially position and support the engaging member with a high degree of accuracy relative to the clutch drum.

The terminology "fixed to" as used herein means an integral construction, as shown for elements R and 4 in FIG. 1, an attachment as shown for elements S and 470 in FIG. 5, or any other type of direct coupling which causes the engaging member to rotate with the rotary element of the planetary gearing to which it is directly coupled or "fixed."

The planetary gear unit of the present invention may serve as a forward-reverse switching mechanism for switching rotation from a driving source between normal (forward) rotation and reverse rotation, which rotation is then transmitted to the drive wheels. As a result, it is possible to reduce costs by reducing number of parts, and furthermore, to provide a forward-reverse mechanism for switching between normal rotation and reverse rotation which is axially compact.

BRIEF DESCRIPTION OF THE DRAWINGS

FIG. 3(a) is a cross-sectional enlarged view of a part of the planetary gear apparatus of FIG. 1 in a driving state during reverse drive, and FIG. 3(b) is a graph of the load on a ring gear in FIG. 3(a) imposed from the direction indicated by the arrow C;

FIG. 4(a) is a cross-sectional view of a portion of the planetary gear apparatus of FIG. 1 in a coast-down state during reverse drive, and FIG. 4(b) is a graph of the load on a pinion in FIG. 4(a) imposed from the direction indicated by the arrow C.

DETAILED DESCRIPTION OF PREFERRED EMBODIMENTS

Preferred embodiments of the present invention will now be described with reference to the drawings.

First Embodiment

Figure 1:
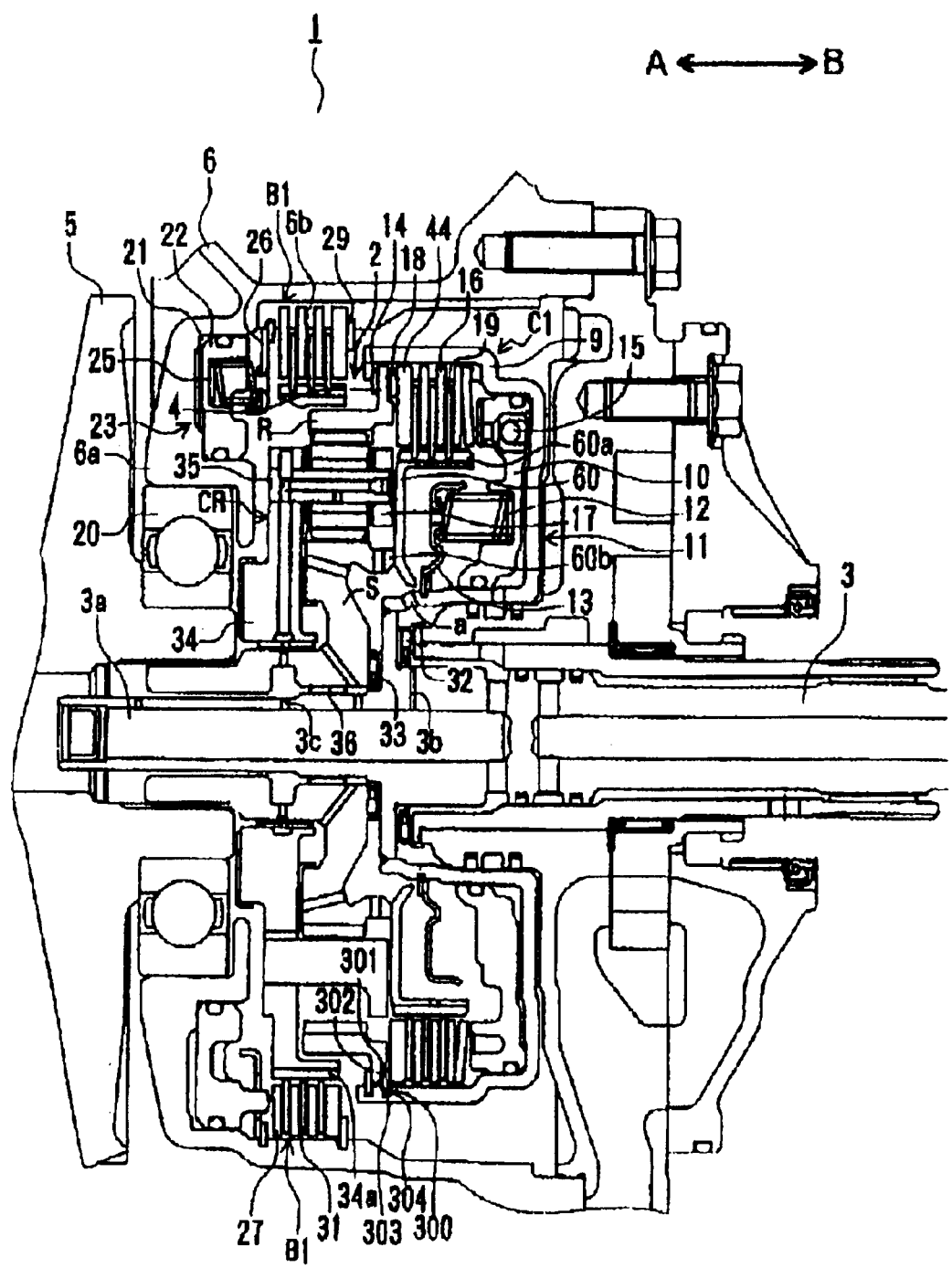
FIG. 1 is a cross sectional view of a planetary gear unit according to a first embodiment of the present invention.

The planetary gear unit of a first embodiment is shown in FIG. 1 incorporated into a belt type continuously variable transmission (hereinafter referred to as "CVT") wherein it functions as a forward-reverse switching mechanism. As shown in FIG. 1, the planetary gear unit of the first embodiment includes the planetary gearing 2, a forward clutch C1, and a reverse brake B1. The planetary gearing 2 includes a sun ring S, a ring gear R, a planetary carrier CR, and a pinion P (refer to FIG. 2) supported by the carrier CR and meshing with the ring gear R, and the sun gear S, all of which members are disposed around an input shaft 3.

The input shaft 3 is coupled to an output portion of a torque converter connected with an engine (driving source) (not shown). The input shaft 3 is also engaged with a clutch drum 9. A tapered snap ring 18 (a first stopper member) axially positions and supports (in the direction indicated by the arrow A in FIG. 1) outer friction disks 16 of the forward clutch CI and a pressure receiving portion 44 of the outer friction disks, all of which are all splined to the interior surface of an end hub portion of the clutch drum 9. The inner friction disks 19 of the forward clutch CI are splined to an outer peripheral surface 60a of an end hub portion of a disk member 60. The disk member 60 has an inner peripheral portion 60b fixed to the sun gear S. In addition, the sun gear S is splined to primary pulley 5. A thrust bearing 33 and a needle bearing 36 axially position and support the sun gear S so that it is freely rotatable about the input shaft 3.

A flange shaped engaging member is, as best seen in FIG. 3(a), integrally formed with and extends radially outward from the ring gear R. The outer periphery of the engaging member 4 is splined with the clutch drum 9 and axially positioned and supported (in the directions indicated by the arrows A–B in FIG. 1) by being sandwiched between the tapered snap ring 18 and a snap ring 14 (a second stopper member).

Furthermore, with the ring gear R meshed with the pinion P of the carrier CR as described above, the pinion P is supported by a side disk 17 and a side disk 34 included in the carrier CR. Moreover, the side disk 34 is splined to the inner friction disks 31 of the reverse brake B1 by a spline 34a formed in an end hub portion of the outer surface of the side disk 34. Outer friction disks 27 of the reverse brake B1 are splined with splines 6b formed in an outer peripheral surface portion of case 6, and are axially positioned and supported by a snap ring 29. The carrier CR includes the side disk 34 and the side disk 17 as described above. Moreover, the side disk 34 and the side disk 17 are positioned such that they sandwich the pinion P therebetween and are integrally coupled by a pinion shaft 35.

In addition, each gear of the planetary gearing 2, namely, the ring gear R, the pinion of the carrier CR, and the sun gear S, is a helical gear HG, as shown in FIG. 3(b) and FIG. 4(b), in order to reduce gear noise during gear meshing.

A hydraulic actuator 11 for the forward clutch C1 includes the clutch drum 9, a piston member 10, a retainer 13, a return spring 12 and a check ball 15 for centrifugal hydraulic discharge. The piston member 10 is fitted into the clutch drum 9 so that it is oil tight. Moreover, an inner peripheral portion of the retainer 13 is fixed to the clutch drum 9. The return spring 12 is positioned and supported by being sandwiched between the retainer 13 and the piston member 10. Furthermore, the return spring 12 is supported by the retainer 13 such that the piston member 10 is biased in the direction indicated by the arrow B in FIG. 1.

Hydraulic actuator 23 for the reverse brake B1 includes a cylinder 21, a piston member 22, a retainer 26 and a return spring 25. The piston member 22 is fitted into a toroidal recess in one side of a partition wall 6a of the case 6. Moreover, an outer peripheral portion of the retainer 26 is fixed to the case 6. The return spring 25 is positioned and supported by being sandwiched between the retainer 26 and the piston member 22. Furthermore, the return spring 25 is supported by the retainer 26 such that the piston member 22 is biased in the direction indicated by the arrow A in FIG. 1.

A lubricating oil supply hole 3a is formed substantially along the axis of the input shaft 3. In addition, transverse holes 3b and 3c are formed in the input shaft 3 leading to its outer peripheral surface from the lubricating oil supply hole 3a. Lubricating oil that is discharged from the transverse holes 3b and 3c is supplied to thrust bearings 32 and 33, as well as to each tooth flank of the gears of the planetary gearing 2, the forward clutch C1 and the reverse brake B1, via a hole a formed in the clutch drum 9.

The planetary gear unit 1 is housed in the case 6 along with the other components of the belt type CVT.

The structure of the present invention essential for axially positioning and supporting the engaging member 4 and the pressure receiving portion 44 of the friction disks (in the directions indicated by the arrows A–B of FIG. 2) relative to the clutch drum 9, by means of the tapered snap ring 18 and the snap ring 14, will now be described.

Figure 2:
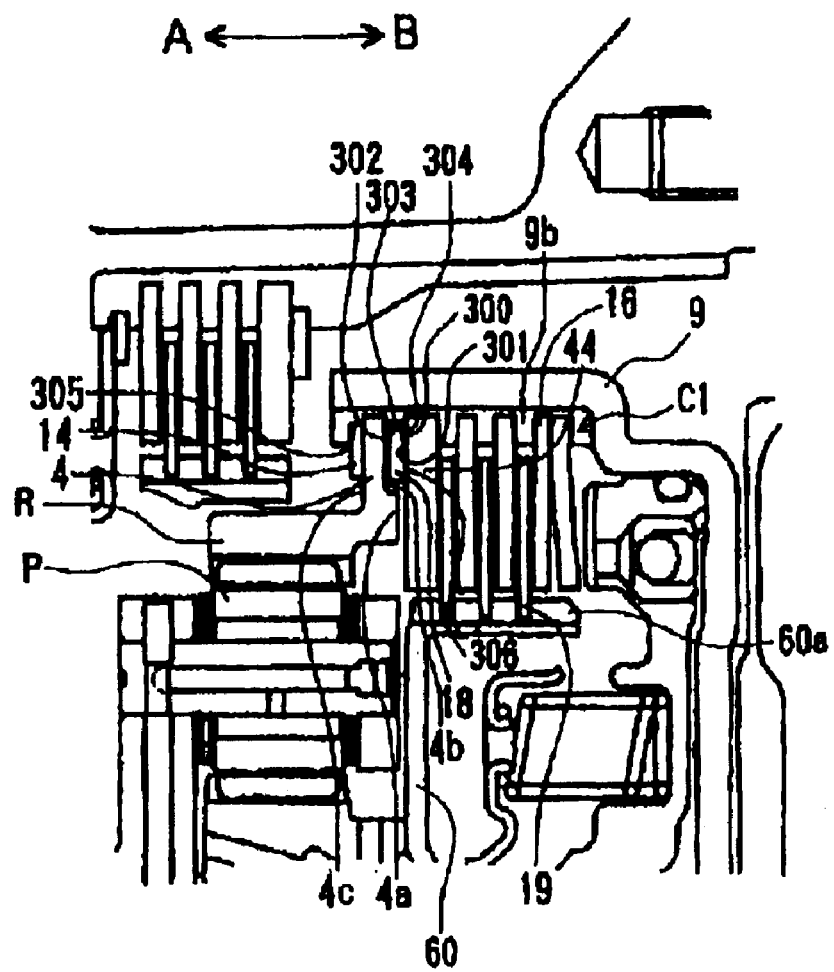
FIG. 2 is a cross-sectional view showing a part of FIG. 1 enlarged.

Splines 9b are formed in the outer peripheral surface of an end hub portion of the clutch drum 9 (FIG. 2). In addition, a toroidal first snap ring groove (recess) 304 as well as a second snap ring groove 305, separated by an interval substantially equal to the thickness of the engaging member 4, are formed around the circumference of the clutch drum 9. The tapered snap ring 18 includes a tapered surface 300 having a tapered side surface and a flat first abutting surface 306 on one side, and a flat second abutting surface 302 on the other side. The first abutting surface 306 and the second abutting surface 302 are substantially parallel with each other.

In assembly, first, a plurality of outer friction disks 16 of the forward clutch C1 are engaged with the splines 9b. Next, a plurality of inner friction disks 19 of the forward clutch C1 are arranged so that they interleave with the plurality of outer friction disks 16, are engaged with splines in the outer peripheral surface 60a of an end hub portion of the disk member 60. Then, a pressure receiving element 44, which is the outermost of the outer friction disks 16, is inserted into the splines 9b. The tapered snap ring 18 is fitted into the recess 304 and the first abutting surface 306 of the tapered snap ring 18 abuts against the side surface of the pressure receiving element 44. Accordingly, the plurality of outer friction disks 16, the plurality of inner friction disks 19, and the pressure receiving element 44 are axially positioned and supported with respect to the clutch drum 9.

The engaging member 4, coupled with the ring gear R (one element of the planetary gearing 2) is engaged with the splines 9b and abuts surface 302 of the tapered snap ring 18. Accordingly, the engaging member 4 is axially positioned and supported relative to the clutch drum 9 by abutment of its side surface 4b against the surface 302 of the tapered snap ring 18.

The snap ring 14 is fitted into the second snap ring groove 305 on the side of a surface 4c of the engaging member 4. This is possible because the second snap ring groove 305 and the recess 304 are spaced by an interval substantially equal to the thickness of the engaging member 4, as described above. As a result, the side surface 4c of the engaging member 4 abuts against the one side surface of the snap ring 14, and thus the engaging member 4 is axially positioned and supported with respect to the clutch drum 9.

Accordingly, the plurality of outer friction disks 16, the plurality of inner friction disks 19 which are friction disks, and the pressure receiving portion 44, are positioned and supported in one axial direction (the direction indicated by the arrow A) on the splines 9b by the tapered snap ring 18.

Further, the engaging member 4 is axially positioned and supported (in the directions indicated by the arrows A–B) with respect to the clutch drum 9 by being sandwiched between the tapered snap ring 18 and the snap ring 14.

With the tapered snap ring 18 fitted into the recess 304, the tapered surface 300 of the tapered snap ring 18 abuts against a corner portion 301 of the recess 304 without clearance. At the same time, the second abutting surface 302 of the tapered snap ring 18 fits such that it abuts against (without clearance) an inner surface 303 on the opposite side to the corner portion 301 of the recess 304.

A toroidal, axially protruding portion 4a is formed on the side surface 4b of the engaging member 4, at a position where it engages the inner peripheral side of the tapered snap ring 18, so as to prevent the tapered snap ring 18 from slipping out. The position of this axial protrusion 4a is axially aligned with the inner peripheral side of the tapered snap ring 18. The protrusion portion 4a is not limited to a toroidal shape and may be any shape, so long as slipping out of the tapered snap ring 18 is prevented. It may, for example, be formed at only one circumferential position or as a plurality of protrusions at various positions.

When working pressure is applied to the hydraulic actuator 11 of the forward clutch C1 by a hydraulic control unit (not shown), the piston member 10 is forced to slide in the direction indicated by the arrow A in FIG. 1, against the force of a return spring 12. Consequently, the outer friction disks 16 and the inner friction disks 19 of the forward clutch C1 are pressed together so that they engage by frictional force. As a result, the input shaft 3 and the primary pulley 5 are directly connected via the clutch drum 9, the disk member 60 and the sun gear S. Accordingly, if the forward clutch C1 is engaged and the reverse brake B1 is released, the torque of the input shaft 3 is output as normal rotation to the primary pulley 5 and thereby drives the primary pulley 5 in a "forward" direction.

In the above-described forward drive state, working pressure acts upon the tapered snap ring 18 in the direction indicated by the arrow A in FIG. 1, via the outer friction disks 16 and the inner friction disks 19 of the forward clutch C1, and the pressure receiving portion 44. However, as described above, the second abutting surface 302 faces the engaging member 4, and the second abutting surface 302 abuts against (without clearance) the inner surface 303 in the recess 304 such that the tapered snap ring 18 is held in the recess 304. As a result, the tapered snap ring 18 is not moved axially by the working pressure. Accordingly, even if the forward clutch C1 engaged, it is possible to maintain accurate axial positioning and support of the pressure receiving portion 44. Consequently, it is possible to execute highly accurate hydraulic control of the forward clutch C1.

As referred to herein "engagement" of the forward clutch C1 refers not only to the state wherein the forward clutch C1 is completely engaged, but also to a state the forward clutch C1 is partly engaged, i.e., the so-called slipping state, dragging state, etc. However, for the purpose of ease of explanation, all of these states will be referred to simply as "engagement" of the forward clutch C1.

As shown in FIG. 3(b) and FIG. 4(b), the gears (the sun gear S, the pinion of the carrier CR and the ring gear R) composing the planetary gearing 2 are each helical gears HG. During forward drive with forward clutch C1 engaged, the carrier is not fixed with respect to the case 6 if the reverse brake B1 is released. As a result, load is not transmitted between the ring gear R and the pinion P, and the torque of the input shaft 3 is not directly coupled to the primary pulley 5 via the clutch drum 9, the forward clutch C1, the disk member 60 and the sun gear S, in the manner described above. Accordingly, when the forward clutch C1 is engaged (during forward drive), the helical ring gear R does not generate thrust force on the planetary gearing 2, as will be described later. Therefore, the ring gear R which is one element of the planetary gearing 2 does not have any impact on the axial positioning and support of the tapered snap ring 18, via the engaging member 4.

When working pressure is applied to the hydraulic actuator 23 of the reverse brake B1 by a hydraulic control unit (not shown), the piston member 22 is forced to slide in the direction indicated by the arrow B in FIG. 1, against the force of a return spring 25. Consequently, the outer friction disks 27 and the inner friction disks 31 of the reverse brake B1 are forced together so that they engage by frictional force, and the inner friction disks 31 are fixed relative to the case 6. As a result, the carrier CR is fixed to the case 6 via the reverse brake B. The input rotation of the clutch drum 9 coupled to the input shaft 3 is transmitted as reverse rotation to the primary pulley 5, via the ring gear R, the carrier CR fixed to the case 6, and the sun gear S. Accordingly, if the reverse brake B1 is engaged and the forward clutch C1 is released, the torque of the input shaft 3 is output as reverse rotation to the primary pulley 5.

During the aforementioned reverse drive, if the forward clutch C1 is released the carrier CR is fixed to the case 6 via the reverse brake B1, as described above. As a result, load is transmitted from the ring gear R to the pinion P in a drive state, and from the pinion P to the ring gear R in a coast-down state.

In other words, in reverse drive, the ring gear R transfers a load 401 perpendicular to a helix angle é of the helix gear HG to the pinion P as shown in FIG. 3(b). As a result, a reaction force 402 acting in the direction opposite to the load 401 from pinion P acts upon the ring gear R. This reaction force 402 is resolved by the helix angle é of the helix ring gear R into a reaction force 406 which is a component of the reaction force 402 in the direction of rotation, and a thrust force 400 which is an axial component (in the directions indicated by the arrows A–B in FIG. 3). Accordingly, in reverse drive, the thrust force 400 is generated in the ring gear R. Furthermore, the thrust force 400 acts in the direction indicated by the arrow A in FIG. 1 to FIG. 3 due to the ring gear R.

When the thrust force 400 is generated in the ring gear R, it acts so as to push the snap ring 14 in the direction indicated by the arrow A in FIG. 3(a). Clearance between the snap ring 14 and the second snap ring groove 305 is provided for fitting, taking into account errors during the manufacturing process, and the like. As a result, when the snap ring 14 is pushed in the direction indicated by the arrow A by the ring gear R and the engaging member 4, the ring gear R, the engaging member 4 and the snap ring 14 move a slight distance equal to this clearance. However, even if the snap ring 14 moves a slight distance, this does not have any affect on any other element since nothing is disposed in the direction indicated by the arrow A (the direction to the left of the figure) from the snap ring 14. Moreover, once the ring gear R and the engaging member 4 have moved this slight amount, they are positioned and supported relative to the clutch drum 9 via the snap ring 14 and the second snap ring groove 305. Thus, the ring gear R and the engaging member 4 are axially positioned and supported. Furthermore, even if the ring gear R and the engaging member 4 move in the direction indicated by the arrow A, the tapered snap ring 18 is positioned and supported in the recess 304. As a result, this movement has no influence on the accuracy of positioning and support of the outer friction disks 16 and the inner friction disks 19 of the forward clutch C1, or on the pressure receiving portion 44.

On the other hand, in a coast-down state during reverse drive, the pinion P exerts a load 404 perpendicular to the helix angle é of the helix gear HG onto the ring gear R as shown in FIG. 4(b). This load 404 is resolved by the helix angle é of the helix ring gear R, into a component 407 in the direction of rotation and a thrust force 403 which is an axial component (indicated by the arrows A–B in FIG. 3(b) of FIG. 4). Accordingly, in reverse drive, the thrust force 403 is generated in the ring gear R which thrust force 403 acts in the direction indicated by the arrow A in FIG. 1 to FIG. 3. Likewise, in a coast-down state during reverse drive, a thrust force 403 is generated in ring gear R acting in the direction shown by the arrow B in FIG. 1.

Accordingly, in a coast-down state during reverse drive, the thrust force 403 generated in the ring gear R acts such that the tapered snap ring 18 is pushed in the direction indicated by the arrow B in the FIG. 3, via the engaging member 4. However, if, for example, the tapered snap ring 18 is a normal snap ring, and the clearance described above is provided, the tapered snap ring 18 moves slightly in the direction indicated by the arrow B. As a result, the pressure receiving portion 44 is pushed in the direction indicated by the arrow B, and there is the possibility of contact between the outer friction disks 16, the inner friction disks and the pressure receiving portion 44, which contact can lead to unwanted wear and seizure.

Because the tapered snap ring 18 is fitted into the recess 304 such that the tapered surface 300 abuts against a corner portion 301 of the recess 304 without clearance, and the second abutting surface 302 abuts against the inner surface 303 of the recess 304 without clearance, movement of the ring gear R and the engaging member 4 in the direction indicated by the arrow B does not occur. Therefore, accurate axial positioning and support of the ring gear R and the engaging member 4 is maintained. Accordingly, it is possible to prevent contact of the outer friction disks 16, the inner friction disks and the pressure receiving portion 44, which in turn prevents unwanted wear and seizure.

Moreover, in a coast-down state during reverse drive, on occasion the thrust force 403 that is generated in ring gear R is large and acts upon the tapered snap ring 18 via the engaging member 4, which thrust force 403 is far more substantial than the thrust force generated during normal running. In this case, there is the possibility that the tapered snap ring 18 will slip out in the radially inward direction due to a force acting towards the center in FIG. 1, since the tapered surface 300 is provided on the side of the pressure receiving portion 44 as shown in FIG. 2. In order to prevent this, the toroidal protruding portion 4a is provided on the side surface of the ring gear R to prevent the tapered snap ring 18 from slipping out radially inward.

Furthermore, by setting the angle of the tapered surface 300 of the tapered snap ring 18 within a certain angle range (for example, if the material is steel, an angle of 16 degrees) with respect to a direction orthogonal to the directions indicated by the arrows A–B, it is possible to obtain sufficient frictional force relative to the normal thrust force 403 at the abutting portion of the tapered surface 300 and the corner portion 301. As a result, during normal running, it is possible to maintain accurate positioning and support of the tapered snap ring 18, and to prevent slippage out toward the center.

In the foregoing embodiment, the helical gears HG are as shown in FIG. 3(b) or FIG. 4(b) are formed facing downwards to the right. However, the helical gears HG may be formed facing in a direction downward to the left of FIG. 4(b). In the case that the helical gears HG are formed such that they face in opposite directions, the direction in which the thrust force 400 and the thrust force 403 act in the drive state and coast-down state during reverse drive is the opposite axial direction, which is one of the directions indicated by the arrows A–B.

With the forward-reverse switching mechanism according to this embodiment, a coast-down state during reverse drive does not occur frequently. Accordingly, the helical gears HG are formed such that the thrust force in the coast-down state during reverse drive acts in the direction indicated by the arrow B in FIG. 3(b). As a result, a thrust force acting upon the tapered snap ring 18 rarely occurs. This is preferable since it is possible to reduce the likelihood that the tapered snap ring 18 will slip out in the inward direction.

As described above, with the planetary gear unit 1 according to the present invention, the outer friction disks 16 and the inner friction disks 19 which form the forward clutch C1, and the pressure receiving portion 44, are axially positioned and supported by the tapered snap ring 18. Further, the engaging member 4 is axially positioned and supported by being sandwiched between the tapered snap ring 18 and the snap ring 14. As a result, it is possible to save cost by reducing the number of parts. Furthermore, because the engaging member 4, the outer friction disks 16 and the inner friction disks 19 of the forward clutch C1 and the pressure receiving portion 44, are axially positioned and supported, it is not necessary to leave a space between the pressure receiving portion 44 and the engaging member 4 for providing the tapered snap ring 18, which makes a more axially compact planetary gear unit overall.

Second Embodiment

A second embodiment of the present invention will now be described with reference to FIG. 5 wherein like reference numerals are used to denote elements of the second embodiment which are the same as those of the first embodiment. Accordingly, with the exception of modifications, description of such elements will not be repeated.

Figure 5:
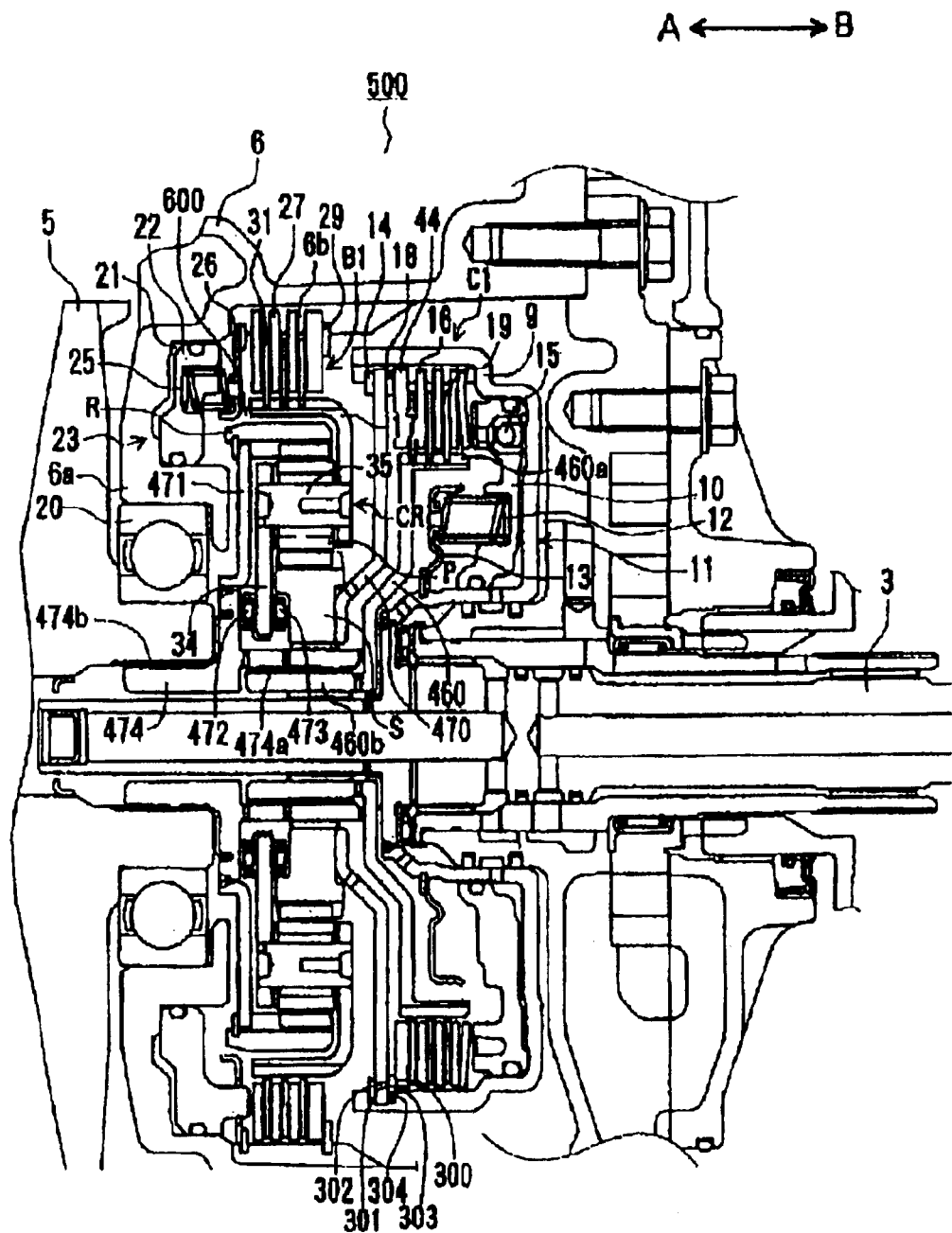
FIG. 5 is a cross-sectional view of a planetary gear unit according to a second embodiment of the present invention.
Figure 6:
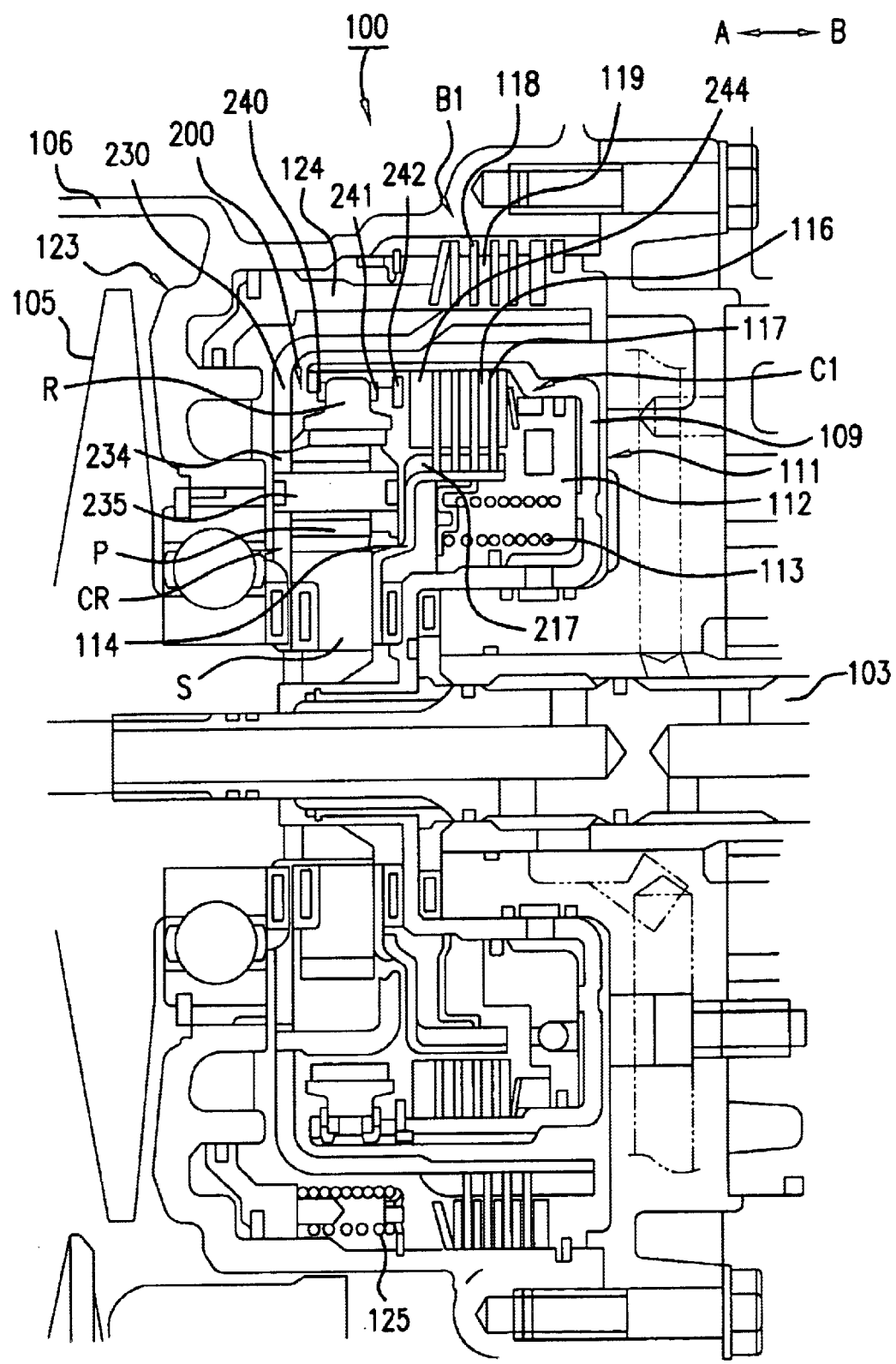
FIG. 6 is a cross-sectional view of a belt type continuous variable transmission with a conventional planetary gear unit.

A planetary gear unit 500 incorporated in a belt type CVT as a forward-reverse switching mechanism is shown in FIG. 5. This planetary gear unit 500 includes planetary gearing 600, the forward clutch C1, the reverse brake B1, and so on. The planetary gearing 600 includes the sun gear S, the ring gear R and the carrier CR, as well as the pinion P and the side disks 34 and 17.

The aforementioned input shaft 3 engages an output portion of a torque converter connected with an engine (driving source—not shown). The planetary gear 3 is also engaged with an interior peripheral portion of the clutch drum 9. The tapered snap ring 18 axially positions and supports (in the directions indicated by the arrows A–B in FIG. 5) outer friction disks 16 of the forward clutch C1, which are splined to the interior surface of an end hub portion of the clutch drum 9 along with a pressure receiving portion 44. Furthermore, the inner friction disks 19 of the forward clutch C1 are splined with outer peripheral surface 460a of an end hub portion of a disk member 460.

A cylindrical sleeve member 474 having a flange is disposed between the disk member 460 and the primary pulley 5. A hub portion 460b of disk member 460 is splined so as to engage splines 474a formed on the interior surface of a hub portion of the sleeve member 474. In addition, the sleeve member 474 has splines on its outer surface for engaging the primary pulley 5.

The sun gear S is freely rotatable around the input shaft 3 and is axially positioned and supported (see arrow A in FIG. 5) by the flange portion of the sleeve member 474 abutting against one face of side disk 34 through a thrust bearing 472 and by a thrust bearing 473 abutting against the other face of the side disk 34.

A disk member 470 is splined with a hub portion of the clutch drum 9, and is axially positioned and supported (in the directions indicated by the arrows A–B in FIG. 5) by being sandwiched between the snap ring 14 and the tapered snap ring 18. The disk member 470 has an inner peripheral portion fixed to the sun gear S. The sun gear S meshes with the pinion P carried by the carrier CR, and the pinion P also meshes with the carrier CR. In addition, the ring gear R engages the outer periphery of a disk member 471 which is fixed to the flange of the sleeve member 474 at its inner periphery. The splines 474b of the sleeve member 474 are engaged with splining of the primary pulley 5, as described previously.

The inner friction disks 31 of the reverse brake B1 are engaged by splining with the outer surface of an end hub portion of the side disk 17. Thus, the outer friction disks 27 of the reverse brake B1 are engaged with the splines 6b formed on the interior of the case 6, and are axially positioned and supported (in the direction indicated by the arrow A–B in FIG. 5) by the snap ring 29.

Furthermore, each gear of the planetary gearing 600 (the sun gear S, the pinion P of the carrier CR and the ring gear R) is the same helical gear HG adopted in the first embodiment.

With the planetary gear unit 500, if working pressure is applied to the hydraulic actuator 11 of the forward clutch C1 by a hydraulic control unit (not shown), the piston member 10 is pushed so that it slides in the direction indicated by the arrow A in FIG. 1, against the force of the return spring 12. Consequently, the outer friction disks 16 and the inner friction disks 19 of the forward clutch C1 are pushed together so that they are engaged by frictional force. As a result, the input shaft 3 and the primary pulley 5 are directly connected via the clutch drum 9, the forward clutch C1, the disk member 460 and the sleeve member 474. Accordingly, the forward clutch C1 is engaged and the reverse brake B1 is released, so that the torque of the input shaft 3 is output as normal (forward) rotation to the primary pulley 5.

The working pressure acts upon the tapered snap ring 18 via the outer friction disks 16 and the inner friction disks 19 of the forward clutch C1, and the pressure receiving portion 44. However, in a manner similar to the first embodiment, the abutting surface 302 of snap ring 18 is disposed facing the disk member 470, and there is no clearance between the abutting surface 302 and the inner surface 303 of the recess 304. As a result, the tapered snap ring 18 is not moved in the axial direction 15 by the working pressure. Accordingly, it is possible to maintain accurate axial positioning and support of the pressure receiving portion 44 relative to the clutch drum 9 and to provide highly accurate hydraulic control of the forward clutch C1.

Moreover, during forward drive when the forward clutch C1 is engaged, the torque of the input shaft 3 is transmitted to the sun gear S via the clutch drum 9 and the disk member 470. However, during forward drive, as was described previously, the reverse brake B1 is released and thus carrier CR runs idle. As a result, there is no transmission of torque to the pinion P of the carrier CR from the sun gear S. Accordingly, when the forward clutch C1 is engaged (during forward drive), no load is transmitted to the sun gear S, and thus no thrust force is generated in the sun gear S. Accordingly, the sun gear S, which is one element of the planetary gearing 600, does not have any influence on the accuracy of axial positioning and support of the tapered snap ring 18 and the snap ring 14, via the disk member 470. Thus, even if the forwarding clutch C1 is engaged, it is possible to execute highly accurate hydraulic control of the clutch.

When working pressure is supplied to the hydraulic actuator 23 of the reverse brake B1 by a hydraulic control unit (not shown), the piston member 22 is forced to slide in the direction indicated by the arrow B in FIG. 5, against the force of the return spring 25. Consequently, the outer friction disks 27 and the inner friction disks 31 of the reverse brake B1 are forced together into frictional engagement, and the inner friction disks 31 are fixed with respect to the case 6. As a result, the carrier CR is fixed relative to the case 6 via the reverse brake B. The input rotation of the clutch drum 9 coupled with the input shaft 3 is transmitted as reverse rotation to the primary pulley 5, via the disk member 470, the sun gear S, the carrier CR, the ring gear R and the disk member 471. Accordingly, if the forward clutch C1 is released and the reverse brake B1 is engaged, the torque of the input shaft 3 is output as reverse rotation to the primary pulley 5.

Each gear of the planetary gearing 600 is a helical gear HG and during reverse drive, in a manner similar to the first embodiment, torque is transmitted to the sun gear S. As a result, a thrust force acts upon the sun gear in the direction indicated by one of the arrow A or the arrow B when in a drive state in forward, or in a coast-down in reverse, due to the pinion P of the fixed carrier CR. When the thrust force acts in the direction indicated by the arrow A, the sun gear S is positioned and supported with respect to the cylindrical sleeve member 474 via the thrust bearings 472 and 473 and the side disk 34, as described above. Accordingly, the sun gear S and the disk member 470 do not move in the direction of arrow A.

On the other hand, when the thrust force acts in the direction indicated by the arrow B, the thrust force generated in the sun gear S acts via the disk member 470 such that the tapered snap ring 18 is pushed in the direction indicated by the arrow B. However, because the tapered snap ring 18 is fitted into the recess 304 such that the tapered surface 300 abuts against the corner portion 301 of the recess 304 without clearance, and the abutting surface 302 abuts against the inner surface 303 of the recess 304 without clearance, misalignment of the sun gear S and the disk member 470 with respect to the direction indicated by the arrow B does not occur, and axial positioning and support of the sun gear S and the disk member 470 is accurately maintained. Accordingly, in a manner similar to the first embodiment, it is possible to prevent contact of the outer friction disks 16, the inner friction disks and the pressure receiving portion 44, which in turn prevents unwanted wear and seizure.

Furthermore, by setting the angle of the tapered surface 300 of the tapered snap ring 18 at a certain angle (for example, if the material is steel, an angle of 16 degrees) with respect to the direction orthogonal to the directions indicated by the arrows A–B, it is possible to obtain sufficient frictional force relative to the normal thrust force of the abutting portion against the corner portion 301. As a result, during normal running, it is possible to maintain accurate positioning and support of the tapered snap ring 18, and to prevent it from slipping out toward the center.

Furthermore, depending on the direction in which the helical gears HG face, the direction of the thrust force generated in the drive state in reverse, and the direction of the thrust force generated in coast-down state in reverse, are determined so as to be one of the directions indicated by arrow A and arrow B. However, with the forward-reverse switching mechanism of this embodiment, the coast-down state during reverse drive does not occur frequently. Accordingly, the helical gears HG are formed such that the thrust force in the coast-down state during reverse drive acts in the direction indicated by the arrow B. This is preferable since, as a result, the state in which thrust force acts upon the tapered snap ring 18 rarely occurs.

As described above, with the planetary gear unit 500 according to the present invention, the outer friction disks 16 and the inner friction disks 19 which are the friction disks of the forward clutch C1, and the pressure receiving portion 44, are axially positioned and supported relative to the clutch drum 9, by the tapered snap ring 18. The disk member 470 is axially positioned and supported relative to the clutch drum 9 by being sandwiched between the tapered snap ring 18 and the snap ring 14. As a result, it is possible to save cost by reducing the number of parts. Accordingly, it is not necessary to leave a space between the pressure receiving portion 44 and the disk member 470 for provision of the tapered snap ring 18, which thus makes it possible to make the entire planetary gear unit 500 more axially compact.

Furthermore, while the first and second embodiments have been described as a single planetary gear unit for use as a forward-reverse switching mechanism, the present invention is not so limited, and may be applied either as a single planetary gear unit for use in a multi-speed automatic transition or as a dual planetary gear unit, or may be used in a planetary gear unit in which a plurality of planetary gear sets are combined. Furthermore, it is possible for the present invention to be applied to planetary gear units other than those used in automatic transmissions.

The disclosure of Japanese Patent Application No. 2001-367728 filed on Nov. 30, 2001, including the specification, drawings and abstract, is incorporated herein by reference in its entirety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A planetary gear unit provided with a planetary gearing and a clutch having friction elements including friction disks and a clutch drum disposed adjacent to the planetary gearing and having an internal surface with a circumferential recess, said planetary gear unit comprising:

an engaging member coupled to one element of the planetary gearing and engaged with an interior surface of the clutch drum of the clutch for rotation therewith; and a first stopper member disposed on the interior surface of the clutch drum for preventing axial movement of the friction disks of the clutch in one axial direction;

a second stopper member disposed on the interior surface of the clutch drum for preventing axial movement of said engaging member in said one axial direction, wherein said first stopper member is a tapered snap ring having (1) a tapered surface abutting against a corner portion of the circumferential recess in order to be acted upon by the working pressure of the clutch and (2) an abutting surface opposite said tapered surface, facing the engaging member and abutting against an inner surface of the circumferential recess in order to receive a thrust force from the engaging member; and wherein the engaging member is axially positioned and supported by being sandwiched between said abutting surface of said first stopper member and said second stopper member.

2. The planetary gear unit according to claim 1, wherein the engaging member has an axially extending protrusion located at an inner peripheral side of the first stopper member.

3. The planetary gear unit according to claim 1, wherein the planetary gearing includes helical gears.

4. The planetary gear unit according to claim 3, wherein no thrust force is generated by the helical gears when the clutch is engaged.

5. The planetary gear unit according to claim 1, wherein said one element of the planetary gearing is a ring gear.

6. The planetary gear unit according to claim 5 wherein said engaging member is fixed to and extends radially from said ring gear to the interior surface of the clutch drum.

7. The planetary gear unit according to claim 1, wherein said one element of the planetary gearing is a sun gear.

8. The planetary gear unit according to claim 7 wherein said engaging member is fixed to and extends radially from said sun gear to the interior surface of the clutch drum.

9. The planetary gear unit according to claim 1, which receives rotation from a driving source and switches the received rotation between normal rotation and reverse rotation and transmits the rotation to drive wheels.

10. The planetary gear unit according to claim 1 wherein the circumferential recess is defined by a pair of spaced, radially extending, and parallel wall surfaces joined at corners by a peripheral bottom surface.

11. The planetary gear unit according to claim 6 wherein the circumferential recess is defined by a pair of spaced, radially extending, and parallel wall surfaces joined at corners by a peripheral bottom surface.

* * * * *